(12) United States Patent
Erickson et al.

(10) Patent No.: US 11,311,942 B2
(45) Date of Patent: Apr. 26, 2022

(54) METAL-CONNECTED PARTICLE ARTICLES

(71) Applicant: Hewlett-Packard Development Company, L.P., Houston, TX (US)

(72) Inventors: Kristopher J Erickson, Palo Alto, CA (US); Krzysztof Nauka, Palo Alto, CA (US); Thomas Anthony, Palo Alto, CA (US); Lihua Zhao, Palo Alto, CA (US); Howard S Tom, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 99 days.

(21) Appl. No.: 15/764,871

(22) PCT Filed: Jan. 29, 2016

(86) PCT No.: PCT/US2016/015723
§ 371 (c)(1),
(2) Date: Mar. 29, 2018

(87) PCT Pub. No.: WO2017/131760
PCT Pub. Date: Aug. 3, 2017

(65) Prior Publication Data
US 2018/0272427 A1   Sep. 27, 2018

(51) Int. Cl.
*B22F 10/10* (2021.01)
*B33Y 10/00* (2015.01)
(Continued)

(52) U.S. Cl.
CPC ............. *B22F 10/10* (2021.01); *B33Y 10/00* (2014.12); *B82B 1/00* (2013.01); *B82B 3/00* (2013.01);
(Continued)

(58) Field of Classification Search
CPC .. B22F 3/008; B82B 1/00; B82B 3/00; B33Y 10/00; C23C 18/30; C23C 24/08; C23C 24/10; C23C 24/106; C23C 18/08
See application file for complete search history.

(56) References Cited

U.S. PATENT DOCUMENTS

| 5,505,996 A | 4/1996 | Nagayama |
| 5,679,724 A | 10/1997 | Sacripante et al. |

(Continued)

FOREIGN PATENT DOCUMENTS

| CN | 1961381 | 5/2007 |
| CN | 101801674 | 8/2010 |

(Continued)

OTHER PUBLICATIONS

Cheng Yang et al: Printed electrically conductive composites: conductive filler designs and surface engineering. Journal of Materials chemistry vol; 1, No. 26 Jan. 1, 2013 XP055625771.
(Continued)

*Primary Examiner* — Rebecca Janssen
(74) *Attorney, Agent, or Firm* — HPI Patent Department (57) ABSTRACT

Apparatus and methods for making metal-connected particle articles. A metal containing fluid is selectively applied to a layer of particles. The metal in the fluid is used to form metal connections between particles. The metal connections are formed at temperatures below the sintering temperature of the particles in the layer of particles.

10 Claims, 7 Drawing Sheets

(51) Int. Cl.

| | |
|---|---|
| *C23C 18/30* | (2006.01) |
| *C23C 24/08* | (2006.01) |
| *C23C 24/10* | (2006.01) |
| *B82B 1/00* | (2006.01) |
| *B82B 3/00* | (2006.01) |
| *C23C 18/08* | (2006.01) |

(52) U.S. Cl.
CPC .............. *C23C 18/30* (2013.01); *C23C 24/08* (2013.01); *C23C 24/10* (2013.01); *C23C 24/106* (2013.01); *C23C 18/08* (2013.01)

(56) References Cited

U.S. PATENT DOCUMENTS

| | | | |
|---|---|---|---|
| 2003/0146529 A1 | 8/2003 | Chen et al. | |
| 2003/0148024 A1 | 8/2003 | Kodas et al. | |
| 2005/0215689 A1 | 9/2005 | Garbar et al. | |
| 2006/0001726 A1 | 1/2006 | Kodas et al. | |
| 2007/0096062 A1 | 5/2007 | Kodas et al. | |
| 2009/0007724 A1* | 1/2009 | Liu ........................ | B22F 10/00 |
| | | | 75/230 |
| 2009/0107550 A1* | 4/2009 | Van Duren ......... | C23C 18/1287 |
| | | | 136/262 |
| 2011/0169884 A1 | 7/2011 | Toyoda et al. | |
| 2012/0003392 A1* | 1/2012 | Godfrey ............... | B22F 1/0018 |
| | | | 427/448 |
| 2013/0075672 A1 | 3/2013 | Rucareanu | |
| 2014/0275317 A1 | 9/2014 | Moussa | |
| 2014/0295087 A1 | 10/2014 | Rickenbacher et al. | |
| 2014/0322501 A1 | 10/2014 | Ederer et al. | |
| 2014/0342497 A1 | 11/2014 | Goel et al. | |
| 2015/0069649 A1* | 3/2015 | Bai ....................... | C04B 35/565 |
| | | | 264/129 |
| 2015/0366073 A1 | 12/2015 | Magdassi et al. | |
| 2016/0181217 A1* | 6/2016 | Prack ..................... | H01L 24/11 |
| | | | 438/613 |
| 2016/0201183 A1 | 7/2016 | Zinn | |
| 2018/0001381 A1* | 1/2018 | Kimblad ................ | B22F 3/008 |
| 2019/0134713 A1* | 5/2019 | Abbott, Jr ............. | B22F 3/1055 |
| 2019/0143559 A1* | 5/2019 | Abbott, Jr ............. | B33Y 10/00 |
| | | | 264/648 |
| 2019/0160532 A1* | 5/2019 | Erickson ................. | B82B 3/00 |
| 2019/0160533 A1* | 5/2019 | Erickson ................. | C23C 24/10 |
| 2019/0160534 A1* | 5/2019 | Erickson ................. | C23C 18/30 |

FOREIGN PATENT DOCUMENTS

| | | | |
|---|---|---|---|
| CN | 101919062 | | 12/2010 |
| CN | 103003891 | A | 3/2013 |
| CN | 104399986 | A | 3/2015 |
| CN | 05081306 | A | 11/2015 |
| CN | 105027690 | A | 11/2015 |
| CN | 105027690 | A | 11/2015 |
| CN | 105081306 | A | 11/2015 |
| CN | 105081306 | A | 11/2015 |
| JP | 6-240306 | A | 8/1994 |
| TW | M511953 | | 11/2015 |
| TW | 201544312 | A | 12/2015 |
| WO | WO-9915293 | | 4/1999 |
| WO | WO-9915293 | A1 * | 4/1999 .............. B22F 1/007 |
| WO | WO-2007-073205 | A1 | 6/2007 |
| WO | WO-2015100085 | | 7/2015 |
| WO | WO-2015162905 | | 10/2015 |

OTHER PUBLICATIONS

3D Printing Materials: Choosing The Right Material For Your Application, Stratasys Direct Manufacturing, Mar. 20, 2015, 21 pages.

Crane et al., Improving Accuracy of Powder Sintering-based SFF Processes by Metal Deposition From Nanoparticle Dispersion, Sandia National Laboratories, Department of Mechanical Engineering, MIT, Department of Materials Science and Engineering, MIT, Sep. 19, 2005, 12 pages.

Williams et al., Manufacturing Metallic Parts with Designed Mesostructure via Three-dimensional Printing of Metal Oxide Powder, Georgia Institute of Technology, Sep. 5, 2007, 11 pages.

* cited by examiner

610
Forming a plurality of metal connections between a plurality of particles wherein the plurality of metal connections are formed at below a sintering temperature of the plurality of particles

METAL-CONNECTED PARTICLE ARTICLES

BACKGROUND

Producing metal parts continues to be dominated by methods such as machining and casting. In addition, polymers, especially high strength polymers, have replaced metal parts in many applications due to the ability to mold polymers in high volume with high detail at low unit cost. In contrast, molding for metals has had some success with approaches like metal injection molding (MIM). However, for a variety of technical and economic reasons, methods of metal molding have not achieved widespread use in forming metal parts. When it comes to forming small numbers of complex metal parts, machining remains the go to methodology. The limitations and costs to producing complex metal parts underscore the need for improved ways to producing complex metal parts.

BRIEF DESCRIPTION OF THE DRAWINGS

The accompanying drawings illustrate various examples of the principles described herein and are a part of the specification. The illustrated examples do not limit the scope of the claims. Throughout the drawings, identical reference numbers designate similar, but not necessarily identical, elements.

FIGS. 2A-C show an example structure consistent with the present specification at three points.

DETAILED DESCRIPTION

For producing small quantities of complex mechanical parts made of metal, the default approach has been machining. Machining is a skill-intensive method and thus may be costly. Increasingly, polymer components can be produced by 3D-printing. 3-D printing however faces challenges in producing high strength parts suitable for replacing metal parts. Many of the materials that are capable of being 3-D printed lack the desired mechanical strength. 3-D printing has been used to rapidly produce casting molds or "lost wax" materials to speed up the formation of metal parts. Some attempts have been made to adapt the 3-D printing approach to metals by depositing metal-polymer composites. A part is formed by building up layer after layer of material. Adaptation of inkjet printing technology has provided precise deposition of multiple materials as part of a 3-D printing process. After forming, the polymer-metal hybrid part is then subjected to a high temperature process to burn away the polymer and consolidate the metal part.

A challenge with this approach is that the polymer occupies a significant fraction of the volume of the printed part in order to hold the part together. Accordingly, as the polymer is removed, generally by heating the component, the loss of volume can cause shrinkage of the part. This shrinkage may be non-uniform due to a variety of factors, including temperature uniformity, part dimensions, air escape routes, gravity, etc. The shrinkage makes it difficult to produce finalized metal parts with good dimensional control using polymer-metal deposits. One proposed solution is to rough form the parts using a 3-D printed part, sinter the part, and then finalize the dimensions of the part with machining operations. This may save on machining time, but still uses the machining resources. In the end, such a hybrid approach offers some benefits over machining alone, however it still presents some complications.

This specification describes forming a solid part composed of metal or other particles that are bound together at the printing location with metal connections. The particles retain their original shapes, during the initial forming and consolidation, helping to assure dimensional control of the fabricated part. This is because the temperature used to form the metal connections is below the sintering temperature of the particles and therefore below the melting temperature of the particles. After the metal connected part is formed, if desired, a high temperature sintering process can be performed to enhance adhesion between the particles. Alternately, the high temperature process can be performed to consolidate some of the empty volume in the part. However, in either case the initial metal connections significantly improve the dimensional stability compared with polymer based approaches as the metal connections retain their mass during the sintering operation. The metal connections reduce the dimensional change experienced by the part, allowing the production of detailed features and greater dimensional control. The initial connections provide greater conformance between the consolidated shape and a post-sintering shape. The use of metal connections also reduces the amount of mass lost during sintering operations. This reduces the shrinkage of the part. Finally, without the outgassing of the volatilized polymer and decomposed by-products, the issues of gas flow and gas escape routes are avoided.

Accordingly, the use of metal connections between the particles, instead of deposition of polymer-metal composite, provides advantages in dimensional stability of the part as the metal connections do not need to remove significant material during a secondary sintering operation. In contrast, the polymer binder of the polymer-metal hybrid parts is decomposed and removed. This results in significant dimensional instability as the green parts (formed parts) are sintered. The greater percentage of the material that is removed during the sintering operation, the greater change in dimensions of the part. In many examples, this reduction in dimension due to binder mass loss is non-uniform or asymmetrical causing warping, distortion, or otherwise hindering the ability to form a part with a predictable geometry after sintering. In contrast, the approach described in this specification avoids much of this because the connections between the particles are formed with metal. The metal may have a similar melting point to the particles. The metal connections help stabilize the particle structure during the secondary sintering. The metal connections also do not experience the large loss of mass.

As used in this specification and the associated claims, a consolidated part is a part composed of particles bound together by metal connections where the particles retain their original shape. In some examples, the consolidating can occur in a reducing atmosphere.

As used in this specification and the associated claims, a final part is a consolidated part that has been subjected to a secondary sintering operation in order to increase the adhesion between particles. The particles in a final part may have their shape modified from their original shape due to the sintering operation.

Accordingly, the present specification describes, among other examples, a method of forming an article, the method comprising: forming a layer of particles; selectively applying a fluid containing a metal to the layer of particles; and forming connections between the particles using the metal in the fluid.

The present specification also describes a method of forming an article, the method comprising: selectively depositing metal nanoparticles onto a layer of particles and fusing the metal nanoparticles to form a consolidated part.

The present specification also describes an apparatus for forming a consolidated part. The apparatus comprises: a spreader to form a layer of particles; a printing device to selectively deposit a metal-containing fluid onto a portion of the layer of particles; and a heater to form metal connections between the particles of the layer of particles using the metal in the metal-containing fluid.

Figure 1:
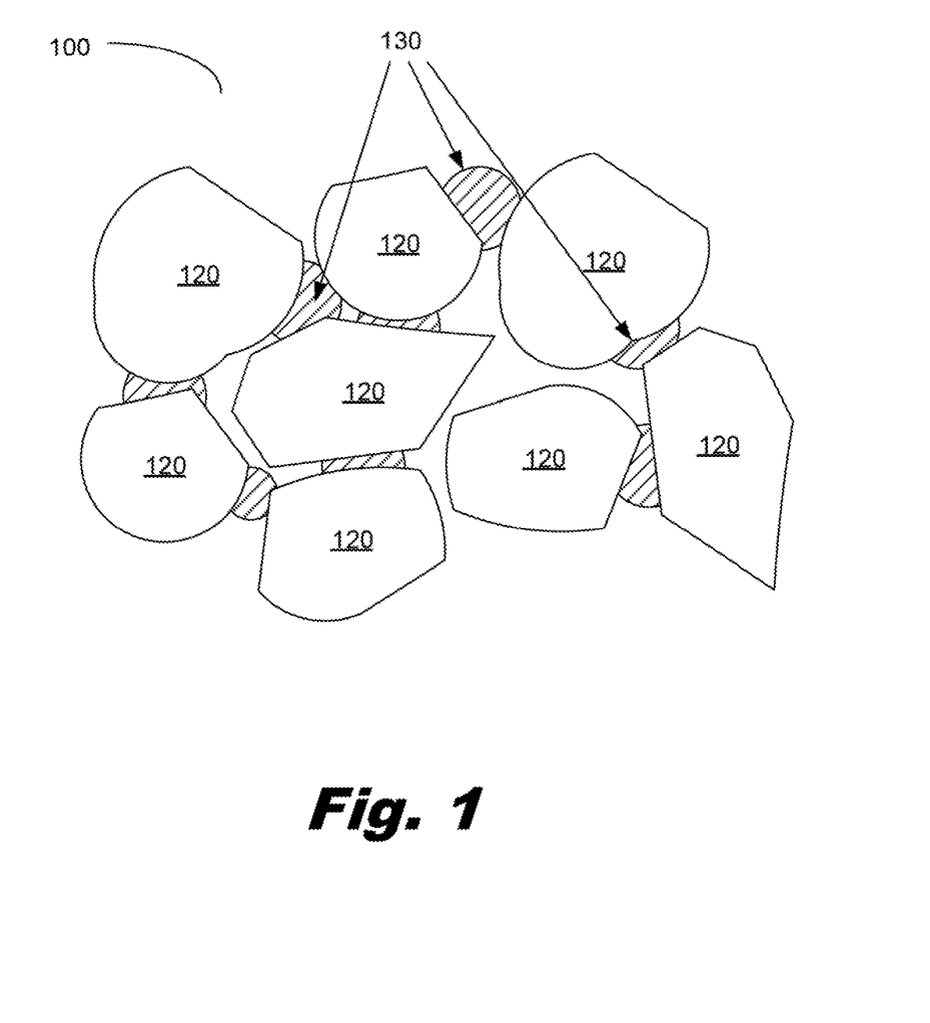
FIG. 1 shows a structure according to one example consistent with the present specification.

Turning now to the figures:

FIG. 1 shows a structure according to one example consistent with the present specification. In the structure, a number of particles (120) are connected together with metal connections (130). The metal connections (130) are formed at a temperature below the sintering temperature of the particles (120).

The structure may be assembled on a substrate. The substrate may be a temporary substrate or a permanent substrate. The substrate may include a heating element to facilitate the initial consolidation of the metal connections (130). The substrate may be substantially flat. Alternatively, the substrate may include features to facilitate shaping the part being formed. Examples of such features include, but are not limited to: groves, holes, bumps, protrusions, prominences, guide features, alignment features, etc. The substrate may be coated with a thin layer of mold release in order to prevent adhesion between the part and the substrate.

Heating may alternately and/or additionally be provided by an overhead source. The heat may be applied across the entire part being formed or may be localized to the area being currently built up. The heat may be provided using any appropriate equipment, for example, IR, NIR, UV or vis lamp, flash-lamp, etc. Heat may be applied from just the substrate. Heat may be applied using just an overhead source. Heat may be applied using a combination of methods and locations. In one example, the system also includes a temperature sensor. The temperature sensor may be a contact sensor or a non-contact sensor, e.g., an IR sensor. The temperature sensor may report the temperature of the part under assembly. The temperature sensor may report the temperature of other portions of the printing system. In one example, a non-contact IR sensor is mounted to the printhead and directed toward the deposition location. A non-contract IR sensor may be located near a heat source and directed towards the target of the heat source.

The particles (120) as used in this specification encompass a wide range of shapes, sizes, materials, etc. Whatever shape, size, distribution, or material is used, the particles retain their shape during the process of applying them to the developing part and forming the metal connections (130) between the particles (120). Several techniques for forming metal connections (130) below the sintering temperature of the particles (120) are described below.

The particles (120) may be of any shape. The particles (120) may be formed by processing. The particles (120) may be naturally shaped materials. The particles (120) may include a variety of different shapes. The particles (120) may be selected and/or sorted to have a given geometry. The particles (120) may include flakes, sheets, plates, or similar flattened, primarily two-dimensional geometry. The particles (120) may include rods, spindles, spheres, blocks, etc. The particles may have a mean and/or median size of 1 to 1000 micron in their largest dimension.

The particles (120) used may be of a single size distribution. The particles (120) may include a mixture of multiple size distributions. The particles (120) may all have a similar and/or identical composition. Alternately, several different types of particles (120) may be combined. For example, multiple types of metal particles (120) could be combined to form an alloy after a secondary heating operation. Alternately, composition gradients can be formed. For example, areas of a part needing ductility may have a higher nickel concentration. By comparison, nickel concentration may be at a reduced level near surfaces that will be in contact with skin. The formation of structured/supported electrodes can be formed. For example, a small area of a noble metal such as platinum or gold can be formed in an area of a refractory metal such as titanium. The refractory metal can be oxidized in a post-forming process to form an insulator leaving the noble metal area to act as an electrode. Because both the particles (120) and the deposited metal can be selected and applied with high precision, a wide variety of non-uniform materials can be readily formed. Thus, composition gradients in the consolidated part can be formed using variation of the particles, variation of the deposited metal connections, or both.

The particles (120) as used in this specification may be formed of a wide variety of materials including, but not limited to: metal, metal oxides, metal carbides, metal nitrides, ceramics, non-metals, metalloids, semiconductors, polymers (especially thermosets but including thermoplastic polymers), minerals, carbon black, graphite, diamond, and organic materials. The particles (120) are stable during the formation of the metal connections. As this may be accomplished in a variety of ways described below, different materials will be more and/or less suited for particular approaches. Further, the material selection has a significant impact on the characteristics of the consolidated part and what kinds of secondary processes may be used. Clearly, the particles selected will also impact the characteristics of a final part.

The particles (120) are spread as a layer on the substrate (110). The layer may be uniform. Alternatively, the layer may have areas of differential thickness to adjust the shape of the developing part. During or after consolidation of the part in the building location, the excess, unattached particles can be removed and recycled. The excess particles may be removed mechanically, for example, using brushes. Alternately, an air jet, fluid jet, or ultrasonic cleaner may facilitate removal. The substrate (110) can be a previously formed particle (120) layer. In this manner, the total thickness of the part can be built up to form the desired thickness of the consolidated part.

The metal is selectively applied to the layer of particles (120). Metal is applied in areas where the particles will be used to form the final article and is not applied in areas that will not be part of the final article. However, as in any manufacturing operation, there may be advantages in forming temporary structures to stabilize or support the developing article that are removed in subsequent operations. While the metal connections (130) between particles (120) can be formed by any suitable method, specific examples will be discussed to show how this may be accomplished. Further, the metal is not formed by melting and/or sintering the particles (120). The metal used to form the metal connections (130) is applied as part of an ink. The ink may then be activated to form the metal connections (130) between the particles (120).

Figure 2A:
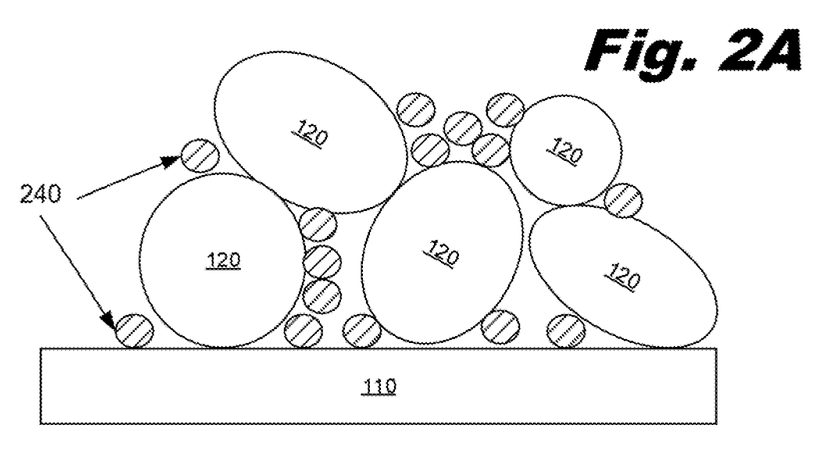
FIG. 2A shows the example structure as-deposited.
Figure 2B:
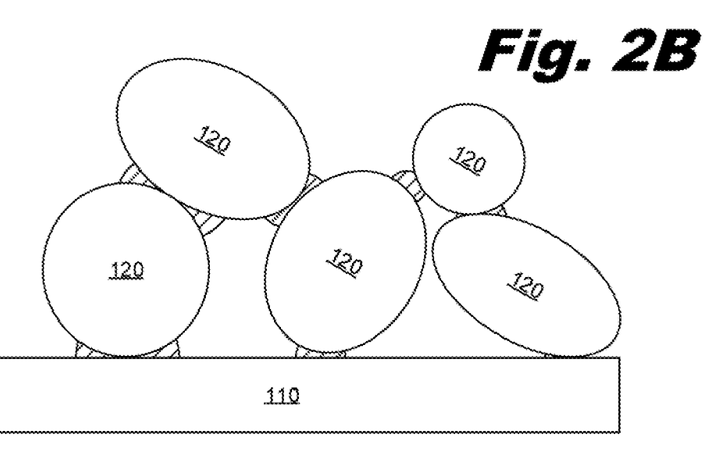
FIG. 2B shows the example structure after consolidation.
Figure 2C:
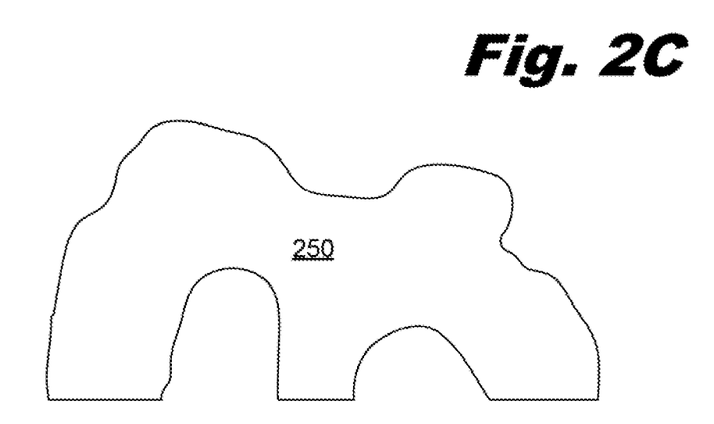
FIG. 2C shows the example structure after sintering.

FIGS. 2A-C show a structure consistent with the present specification at three points in the processing of the part. FIG. 2A shows a structure as-deposited; FIG. 2B shows the structure as a consolidated part; and FIG. 2C shows the structure after a secondary sintering.

FIG. 2A shows the substrate (110) and particles (120). Also, shown are metal nanoparticles (240). The elements depicted in FIG. 2A, are not to scale. Metal nanoparticles (240) have the property of a significantly reduced melting temperature compared to larger particles or bulk materials (Journal of Materials Chemistry C, 2013, 1, 4052). Accordingly, the metal nanoparticles (240) also have a similarly reduced sintering temperature. This provides the ability to form a material that can be thought of as a composite of a single material, as the nanoparticles (240) and the larger particles each have distinct melting and sintering properties. The nanoparticles (240) function as the source of the metal connections between the particles. The nanoparticles (240) can be sintered or modified by temperatures that have no impact on the larger particles (120), even larger particles (120) of the same material. Thus, the substrate (110) can heat the particles (120) to, for example, 400° C. melting and/or reorganizing the nanoparticles (240).

Because the nanoparticles (240) are deposited in an ink, they will tend to concentrate in the areas between the particles (120). This is because as the fluid in the ink evaporates, the droplets will minimize their surface area. This will tend to place them at areas of contact or proximity between adjacent particles (120) as such areas tend to allow very high volumes to new surface area, with the advantage of wetting the surfaces and obtaining a reducing in free energy. The result is that the deposited solids in the inks will tend to concentrate at points of contact between particles (120). Heating the deposited solids causes the nanoparticles (240) to reorganize under a sintering regime, or as the temperature is increased the nanoparticles (240) will melt. As the nanoparticles (240) reorganize and lose their high surface area to volume, they may solidify. Alternate, the part may cool to solidify the material.

In another example, the metal nanoparticles (240) have their stability disrupted by adding a second chemical, for example, sodium chloride. This renders the nanoparticles (240) unstable and causes them to deposit from the solution, forming the metal connections between the particles (120).

In another example, the deposited ink includes a metal salt. Heating of the deposited ink causes the solvent to evaporate and the metal salt to decompose forming metal connections between the particles (120).

Nanoparticles (240) can be formed from a wide variety of metals. However, the surface of some metals tends to oxidize, forming metal oxides. In some examples, it is advantageous to coat the metal nanoparticles (240) to prevent or reduce the surface oxidation. The coating may be of a second metal. For example, an iron nanoparticle (240) could be coated with silver to avoid oxidation. The coating may be a polymer. For example, a nickel nanoparticle could be coated with polyethylene. The coating may be a suitable organic or inorganic coating that reduces and/or prevents the oxidation of the coated metal nanoparticle (240). In some examples, the coating is designed to decompose or volatilize at temperatures under the melting point of the nanoparticle. This may help prevent the coating from inhibiting adhesion between the nanoparticle (240) and the adjacent particles (120). In another example, metal oxide coated nanoparticles are provided with a reducing agent either as part of the particle, as a coating, or applied separately. The reducing agent is activated causing a reduction of the metal oxide and formation of metal connections. The coating may be used to apply an electrostatic charge to the nanoparticles (240). An opposite charge may be applied to the substrate (110) to enhance penetration by the coated nanoparticles (240) into the particle (120) layer. This may allow thicker layers of particles (120) and reduce the number of passes to build a given thickness part.

FIG. 2B shows the consolidated part with the nanoparticles (240) reorganized to form metal connections (130) between the particles (120). The metal connections (130) preferentially occupy spaces between the particles (120) due to the high volume to new surface area ratio provided by those locations. However, not every junction need be connected in order to form a solid, consolidated part. There is a random component to which particles (120) get connected together and which do not. Accordingly, there is a threshold below which the weight percentage of nanoparticles (240) will not provide acceptable strength. In some instances, a part with a lower nanoparticle (240) loading may be brittle or vulnerable to damage even though it is solid. However, as nanoparticles (240) tend to be expensive compared with the particles (120), there is a tradeoff between mechanical robustness and the percentage of nanoparticles (240) used as a percentage of total weight of the part.

Functional parts have been produced with compositions of 0.5, 1, 3, and up to 15 wt. % nanoparticles (240) by weight of the final part. These tests have shown adequate strength to enable handling and clearing of the consolidated part in a silver nanoparticle (240)—copper particle (120) system. Higher loadings of nanoparticles (240) appear to reduce the temperature needed to obtain consolidation, produce higher densities, and may reduce the shrinkage observed during a subsequent heating/sintering operation. This data is consistent with a model where the nanoparticles (240) are binding the particles (120) together and filling gaps between adjacent particles (120). In such a model, higher nanoparticle (240) loads need a lower percentage of the nanoparticles (240) to form connections. This accommodates a lower temperature, as nanoparticles (240) have a size distribution and smaller particles will melt at lower temperatures. Similarly, the greater volume of gaps between particles (120) that is filed by the nanoparticles (240), the less volume of air remains in the part to drive contracture during subsequent thermal processing.

In an example, the consolidating can occur in a reducing atmosphere. The application of pressure to the particle (120) layer increases the density of the consolidated part. This also increases the density of the final part. The use of ultrasonication or vibration may increase the density of the consolidated part. The use of a bimodal distribution of particles with both large and small particles may increase the density of the consolidated part.

A variety of formulations can be applied to the particles to form the metal connections. Because these formulations are easily deposited using an inkjet, they are referred to as inks. However, as used in this specification and the associated claims, the term ink refers to a solution that is capable of being ejected from an ink jet, for example, in a thermal inkjet (TIJ) printing device and/or a piezoelectric inkjet (PIJ) printing device. That is to say, in this specification, the term ink does not indicate the ability to color the material onto which the ink is deposited.

In many of the following ink formulations, one referenced component is an ink vehicle. Ink vehicle is not used in all the ink formulations. Ink formulations without ink vehicle also work as demonstrated by the range of ink formulations below. An ink vehicle is a premix that facilitates compatibility with inkjet printing, especially with thermal inkjet printing. An ink vehicle may include water, co-solvent(s), pH adjuster(s), and/or surfactant(s). The aqueous formulation may also include other additives, such as a biocide and/or an anti-kogation agent.

Examples of suitable co-solvents include 2-pyrrolidinone, N-methylpyrrolidone, 1-(2-hydroxyethyl)-2-pyrrolidinone, 1,6-hexanediol or other diols (e.g., 1,5-Pentanediol, 2-methyl-1,3-propanediol, etc.), triethylene glycol, tetraethylene glycol, tripropylene glycol methyl ether, or the like, or combinations thereof. Whether used alone or in combination, the total amount of the co-solvent(s) ranges from about 1 wt. % to about 60 wt. % of the total weight of the ink vehicle.

Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, also referenced as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the ink vehicle may range from about 0.5 wt. % to about 1.5 wt. % of the total weight of the ink vehicle. pH adjusters may be used to control the pH of the ink vehicle. For example, the pH adjuster may constitute up to about 2 wt. % of the total weight of the ink vehicle.

Examples of suitable biocides include an aqueous solution of 1,2-benzisothiazolin-3-one (e.g., PROXEL® GXL from Arch Chemicals, Inc.), quaternary ammonium compounds (e.g., Bardac® 2250 and 2280, Barquat® 50-65B, and Carboquat® 250-T, all from Lonza Ltd. Corp.), and an aqueous solution of methylisothiazolone (e.g., Kordek® MLX from The Dow Chemical Co.). The biocide or antimicrobial may be added in any amount ranging from about 0.1 wt. % to about 5 wt. % with respect to the total weight of the ink vehicle.

An anti-kogation agent may be included in the ink vehicle. Kogation is the deposit of dried material on a heating element of a thermal inkjet printhead. Anti-kogation agent(s) assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the ink vehicle may range from about 0.1 wt. % to about 5 wt. % based on the total weight of the ink vehicle.

An example of an ink vehicle is: 1 wt. %-50 wt. % 2-pyrrolidinone, 0.1 wt. %-5 wt. % anti-kogation agent, 0.1 wt. %-5 wt. % biocide, 0.01 wt. %-5 wt. % other additives, balance DI water.

All percentages are expressed as weight percent of the total formulation, except when specifically noted otherwise, for example, as part of a component of the final solution.

Ink formulation 1: 67 wt. % silver nanoparticle ink (ink is 40 wt. % silver), and 33 wt. % ink vehicle. An example of the silver nanoparticle ink is JS-B40G from Novacentrix. This ink can be applied with a TIJ and has a fusing temperature of approximately 200° C. with 250° C. resulting in full mechanical properties.

Ink formulation 2: 100 wt. % silver nanoparticle ink. An example is Mitsubishi Silver Nanoparticle Ink NBSIJ-FD02. This ink can be applied with a TIJ and has a fusing temperature of approximately 140° C.

Ink formulation 3: 14 wt. % copper (II) sulfate pentahydrate, 53 wt. % water, 33 wt. % ink vehicle. This ink can be applied with a TIJ and has a fusing temperature of approximately 120° C.

Ink formulation 4: 20 wt. % copper (II) nitrate trihydrate, 80 wt. % water. This in has a fusing temperature of approximately 120° C.

Ink formulation 5: 20 wt. % iron (II) sulfate heptahydrate, 80 wt. % water. This ink has a fusing temperature of approximately 120° C.

Ink formulation 6: 20 wt. % iron (II) nitrate pentahydrate, 80 wt. % water. This ink has a fusing temperature of approximately 120° C.

Ink formulation 7: 10 wt. % copper (II) acetate hydrate, 90 wt. % water. This ink has a fusing temperature of approximately 150° C.

Ink formulation 8: 10 wt. % iron (II) acetate, 90 wt. % water. This ink has a fusing temperature of approximately 150° C.

Ink formulation 9: 100 wt. % copper nanoparticle dispersion. For example, copper nanoparticle dispersion from Promethean Particles. This ink has a fusing temperature of approximately 100° C.

Ink formulation 10: 3 wt. % sodium chloride, 77 wt. % water, 33 wt. % ink vehicle. This ink can be applied with a TIJ. The salt serves to destabilize nanoparticles causing them to leave solution and form solid metal. This reduces the temperature to form the metal connections.

Ink formulation 11: 100 wt. % copper oxide (CuO) nanoparticle ink. For example, ICI-002 from Novacentrix.

Ink formulation 12: 100 wt. % iron oxide nanoparticle ink (20 wt. % $Fe_3O_4$ in water). For example, product 16809 from US Research Nanomaterials, Inc.

FIG. 2C shows the part after heating to a temperature sufficient to allow diffusion and/or reorganization of the adjacent particles (120). This is a secondary sintering operation. It is not a requirement in order to form a consolidated part. Indeed, the metal connections (130) formed between the particles render the consolidated part solid. This secondary sintering operation may be performed after the unconnected particles are removed from the consolidated part. The consolidated part may be removed from the substrate (110) prior to the sintering operation. This may facilitate removal of unconnected particles (120). In some examples, the substrate (110) is maintained during the sintering operation and the final part is removed from the substrate (110) after sintering.

During sintering, the particles (120) may adjust shape. Diffusion between adjacent particles (120) allows the formation of strong mechanical connections. The sintering process can be used to improve adhesion between the particles (120). Sintering can also be used to increase the density of the part. For example, small voids in the structure may be filled with material from adjacent particles (120). Diffusion sintering regimes and remodeling sintering regimes are within the knowledge of the skilled practitioner and useful texts are available to provide guidance and models for such operations, for example: Randall German, 1994, Metal Powder Industries Federation, Princeton, N.J. Finally, because the actual sintering temperature and mechanism temperature thresholds depend on the materials selected for the particles (120) and nanoparticles (240), some experimentation, guided by the melting points of the particles (120) and the examples below, may be needed to optimize the specific part compositions and geometries selected. Three examples of post-consolidation sintering methods are now described:

Inert gas method: cleaned consolidated parts, consisting of ~10 wt. % silver from ink 1 and ~90 wt. % copper from copper particles, are placed into a muffle furnace which is closed and evacuated. The chamber is then filled with nitrogen gas. The furnace is heated from room temperature to 975° C. over 300 minutes and maintained at 975° C. for 90 minutes. The furnace is allowed to cool to room temperature, after which the parts are removed.

Forming gas method: cleaned consolidated parts, consisting of ~10 wt. % silver from ink 1 and ~90 wt. % copper from copper particles, are placed into a muffle furnace which is closed and evacuated. The chamber is then filled with forming gas (4% hydrogen, 96% nitrogen). The furnace is then heated from room temperature to 900° C. over 600 minutes and maintained at 900° C. for 60 minutes. The furnace was is allowed to cool to room temperature, after which the parts are removed.

Carbon packing method: cleaned consolidated parts, consisting of ~10 wt. % silver from ink 1 and ~90 wt. % copper from copper particles are embedded within activated carbon pieces held within an alumina crucible. At least 1 cm of activated carbon separates the consolidated part from the crucible on all sides. The crucible is covered with an alumina cover and placed in an ambient environment furnace. The furnace is brought to 930° C. over 120 minutes and maintained at 930° C. for 240 minutes. The furnace is allowed to cool to room temperature, after which the parts are removed.

The phrase cleaned in reference to the consolidated parts indicates that undesired, non-connected particles (120) may be removed from the consolidated part. In some examples, temporary support structures used during forming are also removed prior to the secondary sintering operation. In other examples, the support structures are removed after the secondary sintering operation.

Figure 3:
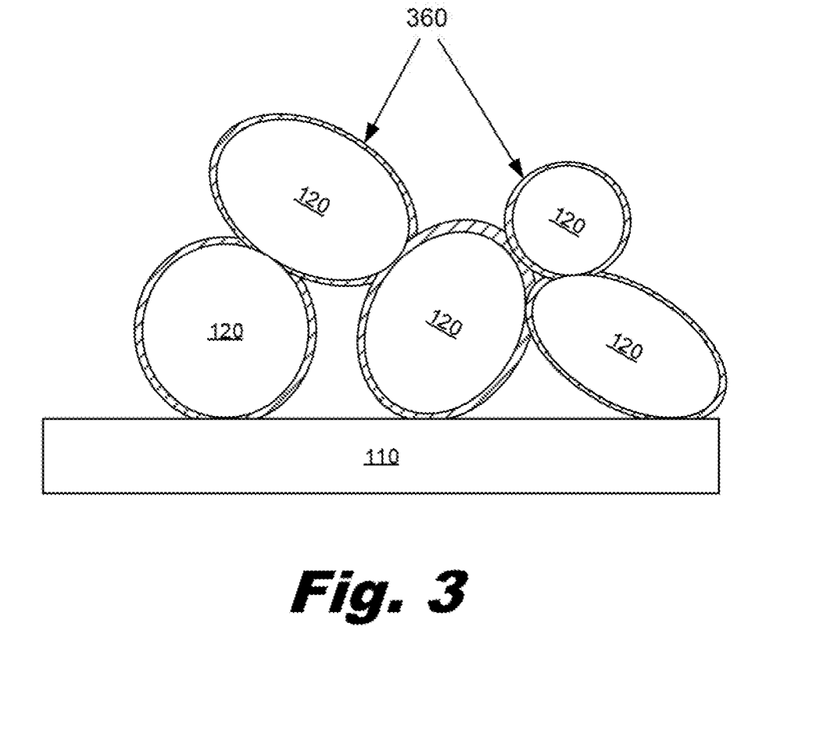
FIG. 3 shows a structure of particles connected with metal connections in one example consistent with the present specification.

FIG. 3 show an example of a fused part formed using another metal deposition method according to the present specification. The substrate (110) is shown with a collection of particles (120). The particles (120) are connected by deposited metal (360).

One method of forming a part consistent with FIG. 3 is to deposit a fluid containing a reducing agent and a metal oxide in the liquid carrier using a printhead. The printhead may be a thermal inkjet (TIJ) or a piezoelectric inkjet (PIJ). In one example, the firing pulse of the TIJ is used to activate a chemical process in the ejected fluid.

Another method of forming a part consistent with FIG. 3 is to selectively deposit a fluid containing a reducing agent onto a layer of metal oxide particles. The reducing agent is the activated to connect the adjacent particles together to form the consolidated part. The consolidated part is bonded together with metal connections. The intermediate form may then be subjected to a secondary sintering process to produce a final part. Alternately, the reducing agent may be applied along with a metal oxide particle containing ink, such as inks formulations 11 and 12, listed above. This can be accomplished by loading the metal oxide particle ink in one ejector and the reducing agent in a second ejector on a printhead.

Another method of forming a part is to deposit a solution of metal salts. The solution is evaporated and the metal salt decomposed to form the metal connections (130) between the particles (120). Examples of such salt solutions include inks 3-8 which have been used to perform this process on stainless steel and copper particle (120) layers.

Another method of forming a part is to deposit a solution containing metals in an organic complex or chelated with a decomposable chelating agent. The organic component is preferentially one that can be decomposed and at a lower temperature in order to facilitate formation of metal connections between the particles (120). The metal may also be suspended in an emulsion or sequestered in a separate phase using micelles which are then disrupted by chemical, thermal, or other processes to cause the precipitation of the metal. As the fluid carriers will tend to occupy the areas of maximum volume to minimum new surface area, this will tend to maximize the deposition in areas where the particles (120) are in contact or close proximity.

The following description provides a description of a method of forming parts using a thermal inkjet printer consistent with this specification. A layer of particles is rolled out in the target area of the printer. The particles may be commercially sourced. For example, stainless steel powder is available as product 088390 from Alfa Aesar. Similarly, copper power is available as product 326453 from Sigma Aldrich. The ideal layer thickness depends on the particle size, the ink being used, the temperature of the particle layer, etc. However, a layer thickness of approximately 100 micrometers has proven workable.

The printer has an appropriate ink loaded in the printhead. The ink is applied to the particle layer. Multiple inks can be used. Each ink may include different metals and/or facilitate different mechanisms of metal connection (130) formation. After the ink has been applied to the desired portions of the layer, a heat lamp can heat the particle layer to the fusing temperature, producing the metal connections between the particles (120). In some examples, the particle (120) layer is maintained at the fusing temperature during application of the ink. The particle (120) layer may be at a higher temperature than the fusing temperature of the ink. There is a tradeoff between fusing time and penetration depth by the ink. If the particle (120) layer is too hot, the ink will tend to fuse on the surface and the thickness of the particle layer (120) should be kept thin in order to facilitate good strength within the consolidated part. Similarly, if the temperature of the particle layer is too low, then the fusing time may be excessively long or the fusing may be inadequate for good strength. Accordingly, some optimization may improve results once the specific ink and particle mixture have been determined. The inks described above have listed fusing temperatures.

A new layer of particles is applied on top of the previous layer. If the previous fusing temperature was high, the new layer may be allowed to cool, for example to approximately 150° C. prior to the application of ink to the new layer. The process is repeated until a suitable thickness has been built up. The part is allowed to cool and the unconnected particles are removed and recycled. The use of a single type of particles (120) makes recycling easy. When forming gradient parts with multiple kinds of particles (120), additional methods such as magnetic separation may help in recovering the unconnected particles (120). If the part is to be used as-consolidated then it is done. Alternately, the part can be subjected to a sintering operation to further consolidate and/or densify the part.

Figure 4:
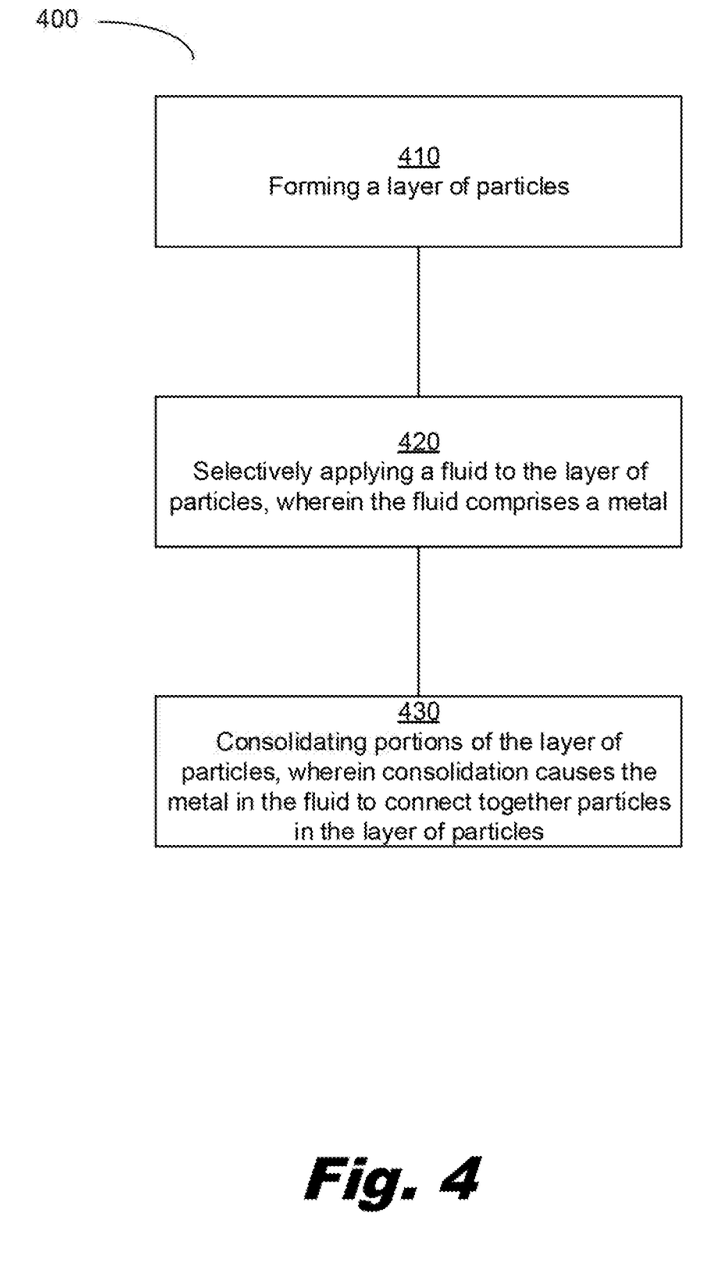
FIG. 4 shows a method of forming an article of particles connected by metal connections in one example consistent with the present specification.

FIG. 4 shows an example of a method (400) consistent with the present specification. The method (400) comprises: forming a layer of particles (410), selectively applying a fluid to the layer of particles, wherein the fluid comprises a metal (420), and consolidating portions of the layer of particles, wherein consolidation causes the metal in the fluid to connect together particles in the layer of particles (430). Each of these operations is discussed in further detail below.

Forming a layer of particles (410) allows rapid placement of the mass used to build the part. Unlike deposition methods where all the mass is provided through a printer jet, most of the mass is provided in the layer of particles. This dramatically reduces the amount of material provided by the printhead which impacts costs and material handling. The layer can be formed in a variety of methods including spray, spreading, air jets, piping, and mechanical methods.

In one example, the layers are pre-formed sheets held together by a meltable and/or sublimatable material, such as ice or dry ice, and the layers are simply applied and dried before application of the ink. The pre-formed layers may include an active species that interacts with the deposited ink.

The part being formed may be mounted on a moving base. After a given layer is completed, the base is lowered and the top of the part becomes recessed compared to a particle collection area. A flat edge is then passed over the developing part, applying a layer of particles, with the excess particles (120) moved to the particle collection area for application in a subsequent pass or part. When the part is complete, the base is elevated and the consolidated part removed. Such an arrangement keeps the distance between the printhead and the current layer constant, provides support on the sides for the previous layers, including the areas of the previous layers that were not consolidated, facilitates rapid placement of the particle layer, and aids handling and recycling of the particles (120) efficient with minimum automation costs.

Selectively applying a fluid to the layer of particles (120), wherein the fluid comprises a metal (420) can be accomplished in a number of ways. One method is to use a printhead to apply the solution to portions of the layer of particles while not applying the solution to other portions of the layer of particles. In another example, a stencil or shield may prevent application to some areas while allowing application to other portions of the layer. The process may be automated, semi-automated, or manual. The portions of the layer may be formed into voxels that are treated individually or several voxels may be treated simultaneously. A single metal containing solution may be used for all treated portions of the layer or multiple metal containing solutions may be used for different parts of the layer, for example to form different compositions, gradient compositions, a tailored microstructure, and/or provide different mechanical properties in different locations of the final part.

As an alternative to depositing material using a thermal inkjet (TIJ) printing device or a piezoelectric inkjet (PIJ) printing device, an aerosol jet, a dropper, or similar component can be used to deposit either droplets or solid material as part of the forming process.

Consolidating portions of the layer of particles, wherein consolidation causes the metal in the fluid to connect together particles in the layer of particles (430) can similarly be accomplished by a variety of methods.

One approach is the use of metal nanoparticles in the solution. Nanoparticles (240) can have melting points and sintering temperatures hundreds of degrees below the temperature of the bulk material and may include micron sized particles. This allows nanoparticles (240) to melt or sinter and connect larger particles (120) without heating the particles (120) to high enough temperature to cause bulk melting or sintering. Applying a smaller temperature change limits the expansion and contraction effects on the part. Applying a smaller temperature change makes the cycle time short. The large melting point separation between the nanoparticles (240) and the particles (240) provides significant system robustness to non-uniformity in heating. The ability to use two or more sizes of nanoparticles (240) with district temperature transitions allows even more control over the connection forming operation. Nanoparticles (240) can be of the same material as the particles, which allows the formation of an article with a single composition. Alternately, the nanoparticles (240) can be used to create different compositions in different areas of the formed part. It the nanoparticles (240) are providing this differentiation, then this can be accomplished using a printhead with multiple solutions, where the different ejectors of the printhead provide different solutions.

Another approach is to precipitate the metal from a solution as part of evaporating the carrier fluid. As the amount of carrier fluid decreases, the concentration of the components in the solution increases. At some point the solution becomes saturated and potentially supersaturated. At this point, further evaporation produces precipitation of the metal in the form of metal salts or metal compounds. The metal salts can then be thermally or chemical decomposed to form metal connections. The evaporating droplets will tend to concentrate at contact points of adjacent particles (120) and between adjacent surfaces where the amount of surface area (and the free energy associated with it) is minimized. This will result in the deposited material being deposited at the contact points of the particles (120) where it will tend to hold them together. The deposited material may decompose under temperature or chemical processes to increase the strength of the connections between the particles (120). In one example, the deposited material is a metal and a chelating agent. In another example, the deposited material is a metal-organic complex. Alternatively, a secondary solution that may not contain a metal can be deposited to chemically modify the metal deposit for forming metal connections.

Figure 5:
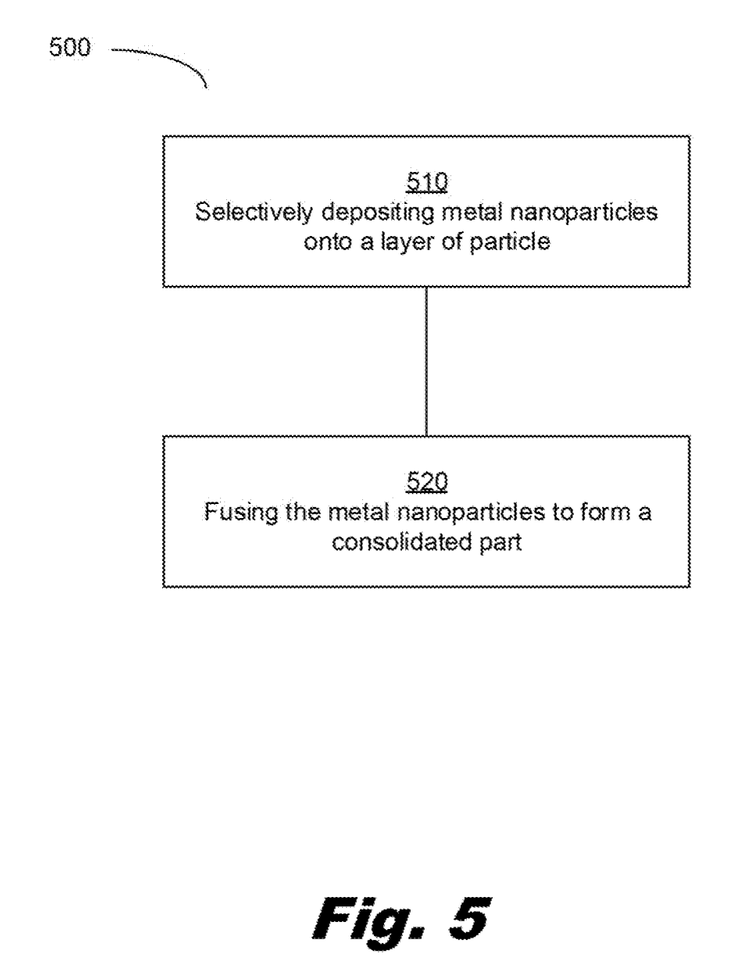
FIG. 5 shows a method of forming a consolidated part in one example consistent with the present specification.

FIG. 5 shows an example of a method (500) consistent with the present specification. The method (500) comprises: selectively depositing (510) metal nanoparticles (240) onto a layer of particles (120) and fusing (520) the metal nanoparticles (240) to form a consolidated part.

The operation of selectively depositing (510) the metal nanoparticles (240) onto a layer of particles (120) can be accomplished by loading a metal nanoparticle containing ink into a printhead or ink cartridge that is attached to a printhead. The printhead is then used to apply the nanoparticles (240) to a layer of particles (120) located in the printing area. In this approach, the carrier fluid that makes up part of the printing ink may be evaporated away, leaving the nanoparticles (240) in the desired locations. Non-limiting examples of suitable inks include ink formulations 1, 2, 9, 11, and 12.

The operation of fusing (520) the metal nanoparticles (240) to form a consolidated part can be accomplished with a number of previously described techniques. For example, the particle (120) layer can be heated to produce sintering and/or melting of the nanoparticles. Alternately, an agent such as ink 10 can be applied to destabilize the ligands that allow the nanoparticles (240) to remain stable in solution. The nanoparticles (240) then leave solution and form metal connections between the particles (120).

Figure 6:
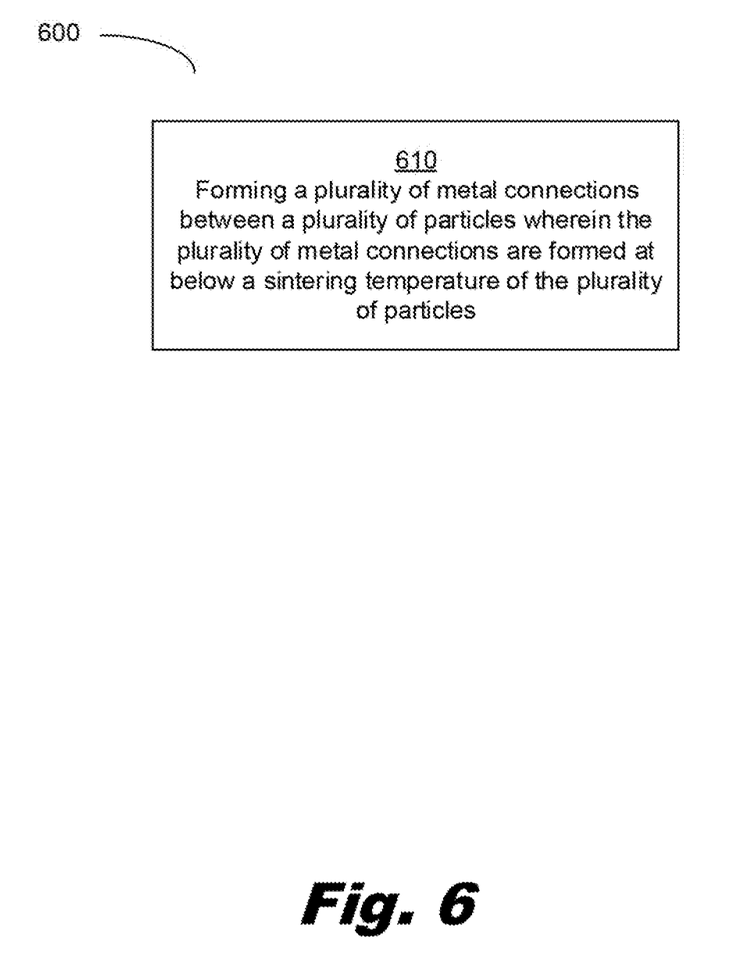
FIG. 6 shows a method of forming metal connections between particles in one example consistent with the present specification.

FIG. 6 shows an example of a method (600) consistent with the present specification. The method (600) comprises: forming a plurality of metal connections between a plurality of particles wherein the plurality of metal connections are formed at below a sintering temperature of the plurality of particles (610).

Operation (610) can be performed used the techniques discussed above. Forming the metal connections at below the sintering temperature of the particles (120) helps provide stability to the structure as the particles are not remodeling during the forming operation. Further, if a secondary sintering operation is performed, the metal connections serve to stabilize the part.

Figure 7:
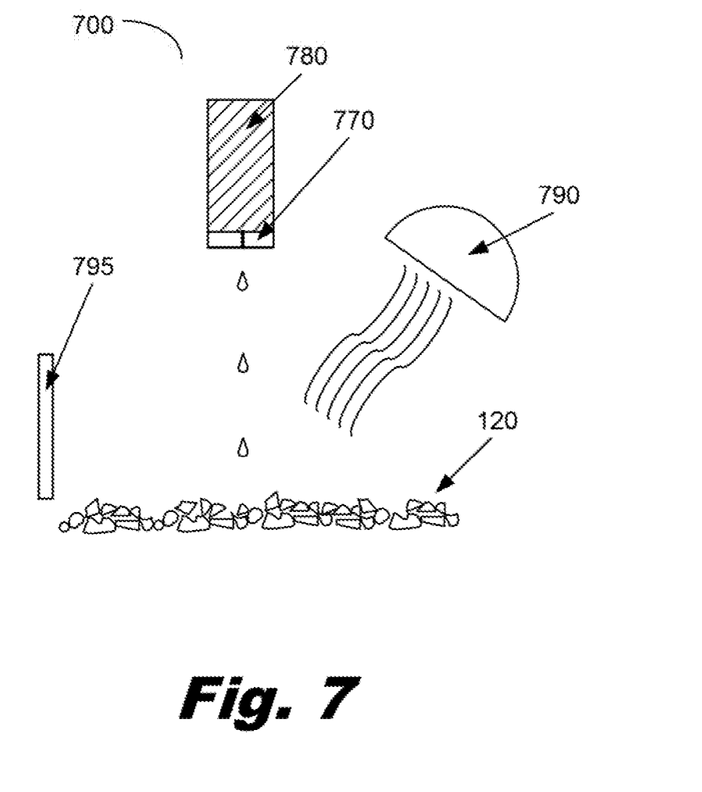
FIG. 7 shows a system for forming a consolidated part in one example consistent with the present specification.

FIG. 7 shows an apparatus (700) for forming a consolidated part according to one example of the present specification. The apparatus (700) comprises: a spreader (795) to form a layer of particles (120); a printing device (770) to selectively deposit a metal-containing fluid (780) onto a portion of the layer of particles (120); and a heater (790) to form metal connections between the particles (120) of the layer of particles (120) using the metal in the metal-containing fluid (780).

The apparatus (700) may be used on a printer such as a 3-dimensional printer. The apparatus (700) may include additional components.

The spreader (795) forms a layer of particles (120). The spreader (795) may deposit the particles (120). The spreader (795) may push the particles (120) to form the layer of particles (120). In one example, the spreader (795) includes a flat blade that is moved across the area where the layer of particles is formed. In other examples, the spreader may have a V-shaped or wedge-shaped blade. In yet another example, the spreader (795) may have a sloped blade. The spreader (795) may have a feed associated with the blade to deposit particles in front of the blade. The spreader (795) may include multiple feeds. The spreader (795) may move in response to a signal associated with a control on the apparatus (700). For example, the apparatus (700) may include a button that, when pressed, causes the spreader (795) to operate. The operation of the spreader (795) may be controlled by a processor, for example, a processor that also controls operation of the printing device (770).

The spreader (795) may function without a blade and without mechanical contact with the particles (120). For example, the spreader (795) may shake or otherwise distribute (120) particles over an area to form the layer. The spreader (795) may include air or other jets to disperse particles (120). The spreader (795) may include a vibrating device to level and densify the particles (120) into a layer. The spreader (795) may include selective feeds to distribute multiple kinds of particles (120) while forming the layer. In one example, the spreader (795) is capable for forming fine distributions of multiple types of particles (120) through selective placement.

The printing device (770) may be an ink jet printing device. In one example, the printing device (770) is a thermal inkjet (TIJ) printing device. In another example, the printing device (770) is a piezoelectric inkjet (PIJ) printing device. The printing device (770) may be an air or fluid pressure based ejection system. The printing device (770) may be part of a printhead. Such a printhead may include a large number of printing devices (770) to eject a single fluid (780). The printing devices (770) on the printhead may eject multiple types of fluid (780).

The fluid (780) includes metal. The fluid (780) may be one of the inks formulations described in this specification. For example, the metal in the fluid may be in the form of metal nanoparticles (260). The fluid (780) may include components designed to facilitate operation of the printing device (770). The fluid (780) may contain water. The fluid (780) may be a water-free composition. In one example, the fluid (780) is primarily water, with the metal nanoparticles comprising approximately 2 wt. % to approximately 60 wt. % of the fluid by weight of the total fluid. The fluid (780) may include a chemical species that is activated by the ejection. In one example, this activation is due to the temperature of an ejection bubble of a thermal inkjet. In another example, this activation is due to exposure to the environment during the transit from the ejector (770) to the layer of particles (120), for example, reaction with atmospheric oxygen. In another example, this activation is an electrolytic interaction with a thermal inkjet firing resistor.

The heater (790) may be an infrared (IR) heat source. The heater (790) may include a reflective or parabolic dish with a heat generating element, for example, a resistor, a series of wires, etc. The heater (790) may be associated with the ejector (770). The heater (790) may move independently of the ejector (770). The heater (790) may be operated continuously. The heater (790) operation may be coordinated with the activity of the ejector (770). The heater (790) may be located in contact with a substrate supporting the layer of particles (120).

The heater (790) may have an associated thermal sensor. In one example, the thermal sensor is a non-contacting thermal sensor. In another example, the thermal sensor is located in and/or on a substrate supporting the layer of particles (120).

The layer of particles (120) may be made of a single type of particles (120) or of multiple types of particles (120). The layer may be uniform. The layer may include areas of variable thickness and/or composition. The layer may be formed on a substrate. The layer may be formed on a previously formed layer of particles that have been subjected to consolidation. In some examples the layer is approximately 100 micrometers thick. In some examples, the layer is between 20 and 200 micrometers thick. In some examples, the layer is between 1 and 1000 micrometers thick. In some examples, the particles (120) and metal in the fluid (780) comprise a common material. In other examples, the particles (120) are an oxide, a mineral, a polymer, a ceramic, a glass, a metal, a carbide, a nitride, and/or an organic. The ability to use a wide range of types and mixtures of particles (120) in the particle (120) layer is a strength of this approach to forming articles.

Within the principles described by this specification, a vast number of variations exist. The examples described are examples, and are not intended to limit the scope, applicability, or construction of the claims.

What is claimed is:

1. A method of forming a consolidated part comprising:
spreading a layer of particles;
selectively applying a fluid to a portion of the layer of particles, wherein the fluid comprises an ink vehicle and metal nanoparticles and wherein the fluid does not include a polymeric binder;
consolidating the metal nanoparticles in a reducing atmosphere to form metal connections between individual particles in the layer of the particles, where the fluid was applied to the particles to form a consolidated part and wherein no polymeric binder is applied to the particles; and
repeating the spreading of an additional layer of particles on the previously formed layer of particles, selectively applying the fluid to a portion of the additional layer of particles, and consolidating the metal nanoparticles, multiple times, to form a three-dimensional printed consolidated part.

2. The method of claim 1, Therein. the consolidating comprises an elevated temperature cycle of under 400° C.

3. The method of claim 2, wherein the metal nanoparticles are coated with a coating to reduce oxidation of the metal in the metal nanoparticles.

4. The method of claim 1, wherein the metal nanoparticles in the fluid are present as a metal-organic complex.

5. The method of claim 1, wherein the consolidating comprises an elevated temperature cycle of under 250° C.

6. The method of claim 1, wherein the layer of particles comprises particles of two distributions.

7. The method of claim 1, wherein the metal nanoparticles are smaller than the particles of the layer of the particles.

8. The method of claim 1, wherein the method further comprises forming a final part by sintering the consolidated part to increase adhesion between the particles.

9. The method of claim 1, wherein the ink vehicle is water.

10. The method of claim 1, wherein the ink vehicle comprises water and co-solvent.

* * * * *